March 17, 1936.  G. WAZAU  2,033,964
PENDULUM TYPE MATERIAL TESTING APPARATUS
Filed Oct. 20, 1931  3 Sheets-Sheet 1

INVENTOR:
Georg Wazau,
by Murray C. Boyer
Atty

March 17, 1936.  G. WAZAU  2,033,964

PENDULUM TYPE MATERIAL TESTING APPARATUS

Filed Oct. 20, 1931  3 Sheets-Sheet 2

INVENTOR:
Georg Wazau,
by Murray C. Boyer
Atty.

March 17, 1936.

G. WAZAU 2,033,964

PENDULUM TYPE MATERIAL TESTING APPARATUS

Filed Oct. 20, 1931

INVENTOR:
Georg Wazau,
by Murray C. Boyer
Atty

Patented Mar. 17, 1936

2,033,964

UNITED STATES PATENT OFFICE 2,033,964

PENDULUM TYPE MATERIAL TESTING APPARATUS

Georg Wazau, Berlin, Germany, assignor to Baldwin-Southwark Corporation, a corporation of Delaware Application October 20, 1931, Serial No. 569,958
In Germany October 21, 1930

7 Claims. (Cl. 265—17)

This invention relates to apparatus for measuring forces, and more particularly to apparatus of the pendulum type having a multiple range of measurements such as are employed, for example, in the construction of balances and, in the case of material-testing apparatus, for determining the strengths of various materials.

In pendulum balances of the type heretofore known, a primary fault was that the friction of the parts between those subjected to the stress of the force-imparting mechanism and those of the indicating mechanism caused substantial error to be shown upon the indicating device. The error due to the influence of friction decreases as the weight of the pendulum is increased and in proportion to such weight. In other words, the greater the weight of the pendulum, the less is the amplitude of the swing thereof and, consequently, the less is the friction. Where, on the other hand, effort was heretofore made to overcome this effect by increasing the weight of the pendulum, this consequently and necessarily increased the inertia of the pendulum which, in turn, was shown on the indicating device. The inertia effect is particularly noticeable when the specimen slips in the grips.

It has long been recognized that, due either to the frictional losses or the inertia effect, testing devices of the pendulum type were accurate only within the range of the upper ninety percent (90%) of their capacity and that in the range of the lower ten percent (10%) of their capacity the results indicated were so inaccurate as to lack utility, since it is impossible to compensate or calculate correctly compensations to overcome these inaccuracies.

The present invention overcomes these inaccuracies in the pendulum type of apparatus by the provision of multiple pendula which may be optionally coupled together to provide, as desired, an inertia effect related to the load to be imposed so that the amplitude of the swing of the pendula may be maintained relatively small. Thus, when a high load is to be imposed, a plurality of pendula are connected to impose a high inertia and at low loads the pendula are disconnected so that only a small inertia has to be overcome. Obviously, the relationship of the inertia to the load may be the same or comparatively the same in both instances.

It is a primary object of the invention to increase the exactitude of measurements performed by such apparatus.

A still further object is to simplify generally the construction of such apparatus.

And a still further object is to make provision for a plurality of ranges of measurement on the apparatus.

The objects above-specified are accomplished in the apparatus forming the subject of my invention by the employment of a plurality of pendulums which may be coupled in series as desired, and which are furnished with exchangeable weights, and of which the first pendulum conforms to the lowest range of measurement, while each additional series-connected pendulum represents a higher range. The arrangement may be such that merely the last pendulum of any particular series is furnished with a weight corresponding with the particular measurement range desired. For many purposes, two series-connected pendulums will be found adequate, whereby, as regards the lower range of measurement, there is employed merely the pendulum which is connected in direct fashion with the power lever of the apparatus, this pendulum carrying the weight; while for the higher range of measurement, this pendulum is connected in series with a second pendulum and then acts merely in the capacity of a transmission lever, the weight now being carried by the second pendulum.

In conjunction with the apparatus, it is preferable to employ merely one indicating device which is so arranged that the same may be acted upon by any single pendulum, selectively, or both pendulums, as desired.

The apparatus may be used for testing the strength of any particular material, such as the tensile strength; the compressive strength; the strength of flexure; the breaking strength; hardness, etc.

The invention will now be described more fully with reference to the accompanying drawings, some of which are more or less diagrammatic, in which.

Figure 1:
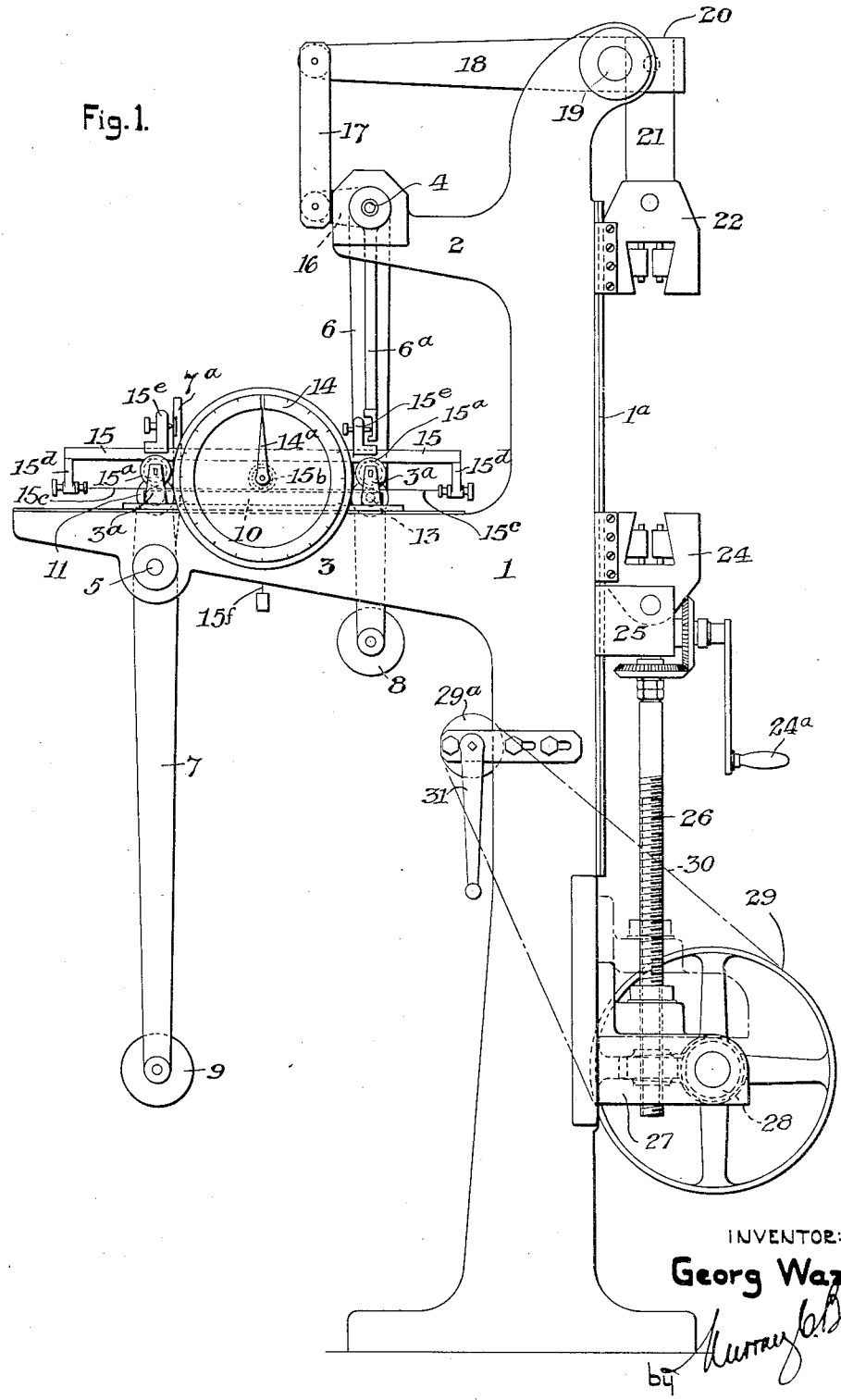
Figure 1 is a view in side elevation of material-testing apparatus embodying my invention.

Referring now to the drawings, there is provided a pillar or post 1 having two lateral arms or brackets 2 and 3 carrying the bearings 4 and 5 for the pendulums 6 and 7. The latter are furnished with detachable weights 8 and 9, and may be connected in series by a link 10. For this purpose, the link 10 is mounted so as to be rotatable on the upper end 11 of the two-armed pendulum 7, and possesses at its free end a hook 12 which, upon the link being oscillated about its fulcrum, may engage with a stud 13 disposed approximately at the center of the pendulum 6. On the arm 3 there is also mounted the indicating device 14, which may comprise a circular dial and a pointer 14a adapted to move over the same, the movements of the pointer indicating the angular displacement of the one or the other of the pendulums, dependent upon which pendulum is in operative engagement with the rod 15; the latter being mounted for sliding movement under the influence of the pendulums. This rod 15 may ride upon small wheels 15a mounted for rotation in suitable supports 3a carried by the bracket 3.

The motion of the pendulums or either of them is transmitted to the pointer 14a of the dial 14 through the rod 15 which is operatively connected to the spindle of said pointer; such spindle having a small wheel 15b around which a fine cord 15c is passed one or two turns, with its opposite ends connected to arms 15d depending from the rod 15. These arms are provided with suitable screw members so that the cord 15c may be maintained under the desired tension. The rod 15 is provided with upwardly projecting members 15e for operative engagement with the pendulums. For this purpose, the latter may have supplemental elements or extensions 6a and 7a arranged to contact with adjusting screws carried by the members 15e. In order that the pointer 14a may be returned to zero position after each testing operation, the spindle thereof may carry a weighted cord 15f which will serve to effect such result.

The force to be measured is communicated to the pendulum 6 by reason of the fact that the latter is constructed in the form of an angle lever having its fulcrum at 4. At the free end of the shorter arm 16, there is connected a link 17 which, in turn, is pivotally connected to the free end of the longer arm 18 of a two-armed lever having its fulcrum 19 at the top of the pillar 1, while the shorter arm 20 of the two-armed lever is pivotally connected with the rod 21 having at its lower end holding means of any suitable known kind, such, for example, as jaws 22, for the reception of the sample of material to be tested.

To subject the sample to the desired forces, there is provided, in addition to the jaws 22, a movable clamping device 24 which may consist, for example, of a sliding block or vice movable along a slideway 1a mounted on the pillar 1 by means of a carriage 25. The block or vice is engaged from below by a threaded spindle 26, which is mounted to rotate in the arm 27 disposed adjacent to the lower end of the pillar 1 and receives its rotary motion from a transmission gear 28 mounted on the same arm 27. The power may be supplied to this gear through the medium of the pulley 29, the belt 30, and a hand wheel, or the crank 31 shown in Fig. 1, operatively arranged with respect to another pulley 29a around which the belt passes, which latter pulley may be carried by a spindle or shaft mounted on the pillar 1 below the arm 3 or at any other suitable point. Quick adjustment of the lower grip 24 may be effected by the crank 24a shown in Fig. 1, which is geared to the threaded spindle 26.

Figure 3:
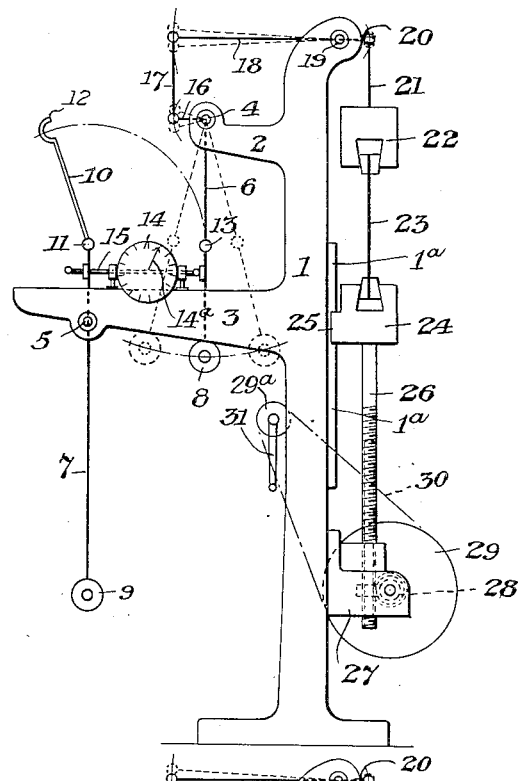
Fig. 3 is a diagrammatic view illustrating the mechanism as arranged to cover the lowest range of measurements.
Figure 4:
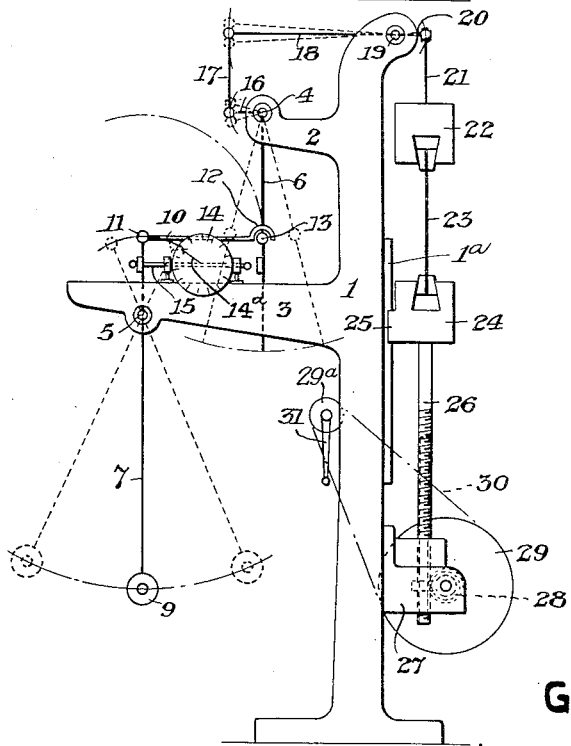
Fig. 4 is a view similar to Fig. 3 in which, however, provision is made for an additional measurement range.

The arrangement more or less diagrammatically shown in Figs. 3 and 4 illustrates the invention in its adaptation to an apparatus for determining the breaking strength.

Figure 5:
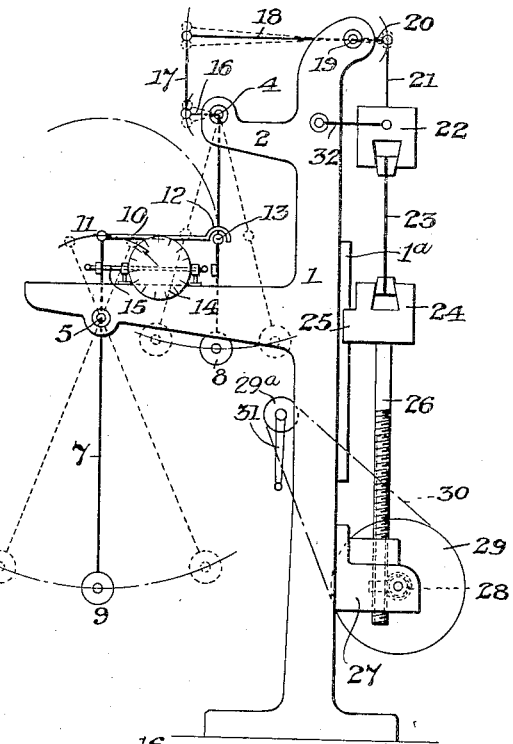
Fig. 5 is a diagrammatic view of a modified form of apparatus embodying my invention.
Figure 2:
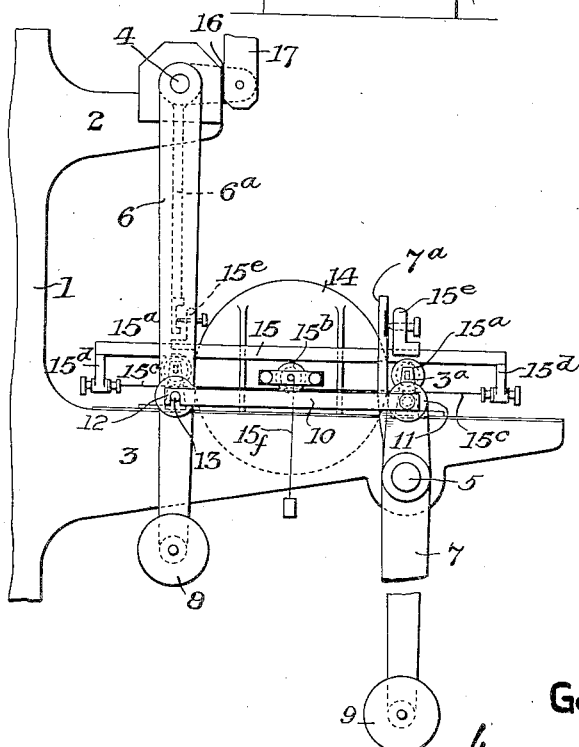
Fig. 2 is a rear elevation of a portion of the structure shown in Fig. 1.

When employing the machine for measuring the compressive strength, the upper clamping device 22 will require to be secured against any tendency to buckle, and this may be arranged in any suitably known manner as, for example, by pivotally connecting a link 32 to the pillar 1 and the upper clamping device 22, as illustrated in Fig. 5.

As illustrated in Fig. 3, the two pendulums 6 and 7 are not coupled together, hence merely the pendulum 6 serves for measurement of the force and, accordingly, it is only this pendulum 6 which is connected with the actuating bar 15 of the indicating device 14. This arrangement may be used to cover the lower range of measurement: for example, up to one thousand (1,000) pounds.

In Fig. 4, the two pendulums 6 and 7 are coupled by the rod 10. The weight has been removed from the pendulum 6 so that merely the weight 9 of the pendulum 7 serves for measurement of forces greater than those possible under the arrangement illustrated in Fig. 3: for example, up to two thousand (2,000) pounds, as clearly shown in this figure (Fig. 4), it is the pendulum 7 which, in this case, is connected with the actuating bar 15 of the indicating device 14.

In the arrangement according to Fig. 5, the two pendulums are also coupled together, and both are furnished with weights; it is only the pendulum 7, however, which is connected with the bar of the indicator and the range here may be as high as three thousand (3,000) pounds, for example. In this case, the reading furnished by the indicating device will require a certain correction, which will depend upon the actual size of the weight 9.

The testing of the strength of flexure is in the nature of a tensile stress, and the forms of apparatus illustrated in Figs. 3 and 4, for instance, may be employed. Likewise, a breaking strength test is simply an extension of any tensile stress test. The test for hardness is in the nature of a compression test and, in carrying out a test of this character, the jaw 24 is moved toward the jaw 22, with a specimen between the same.

When a single pendulum is employed, the rod 15 will be moved in one direction by the movement of the pendulum, together with the cord controlling the position of the indicating pointer 14a. As such indicating pointer is moved, the weighted cord 15f will be wound on the spindle of the same. When the test is finished, the pendulum will return to rest, and the weighted cord 15f will return the pointer 14a to zero position and restore the member (or members) 15e to initial position.

It will be understood that no restriction is made to the specific forms of embodiment shown, and that various modifications are quite possible within the meaning of the above description without departing from the spirit of the invention as embodied in the annexed claims. Thus, for example, the forces to be measured are not necessarily communicated by means of levers and links, and other suitable means may also be employed. In the same manner, the coupling of the pendulums is not essentially performed with the assistance of a hinged bar. It will be also understood that not only two but also three or more pendulums may be coupled in series, in which case a correspondingly greater number of measurement ranges will be available.

I claim:

1. Testing apparatus of the pendulum type having a multiple range of measurement for the measurement of forces, comprising a plurality of pendula suspended from independent axes, means for optionally connecting said pendula in series, a detachable weight carried by each pendulum, means for holding an article to be tested, means for subjecting said article to a desired force, a lever system operatively connected to said last-named means through said article for communicating said force to said pendula, indicating means, and means for optionally but positively linking one or more of said pendula with said indicating means.

2. Testing apparatus of the pendulum type having a multiple range of measurement for the measurement of forces, comprising a plurality of pendula suspended from independent axes, means for optionally but positively connecting said pendula to vary the range of measurement of said apparatus, means for subjecting the test material to a desired force, a lever system communicating said force through said test material to at least one of said pendula, indicating means, and means for linking said indicating means with said pendula.

3. Testing apparatus of the pendulum type having a multiple range of measurement for the measurement of forces, comprising means for gripping an article to be tested, means for subjecting said article to a desired force, a plurality of pendula suspended from independent axes, a lever system communicating said force through said article to one of said pendula, means for positively connecting a second pendulum to said first-mentioned pendulum, indicating means, means for linking said indicating means with one of said pendula, and means for supporting detachable weights on each of said pendula.

4. In testing apparatus of the pendulum type having a multiple range of measurement for the measurement of forces, the combination of two pendula suspended from independent axes, means for positively connecting said pendula in series, detachable weights, means for supporting said weights upon each of said pendula, clamping means for holding the material to be tested, means for applying the desired force to said material, a lever system comprising means for communicating said force through said test material to said pendula, indicating means, and means for linking said indicating means and at least one of said pendula.

5. In testing apparatus of the pendulum type having a multiple range of measurement for the measurement of forces, the combination of two pendula suspended from independent axes, means for positively connecting said pendula in series, means for supporting a detachable weight on one of said pendula, means for holding the material to be tested, means for applying a desired force to said material, a lever system comprising means for communicating said force through said material to said pendula, and an indicating means associated with said pendula.

6. Testing apparatus of the pendulum type for measuring forces applied to a test piece, comprising means for gripping the test piece, means for applying a force to said test piece, means for indicating the force applied to said test piece, and linkage between said gripping means and said indicating means comprising a plurality of separable pendula suspended from independent axes, and means for positively connecting said pendula.

7. Testing apparatus of the pendulum type for measuring forces applied to a test piece, comprising means for gripping the test piece, means for applying a force to said test piece, indicating means, linkage between said gripping means and said indicating means comprising a plurality of separable pendula suspended from independent axes, means for positively connecting said pendula, and means for connecting each of said pendula to said indicating means.

GEORG WAZAU.